United States Patent [19]
Ambrosio et al.

[11] Patent Number: 4,755,984
[45] Date of Patent: Jul. 5, 1988

[54] ECHO CANCELLER FOR BIDIRECTIONAL DIGITAL TRANSMISSION

[75] Inventors: Renato Ambrosio, San Raffaele Cimena; Carlo Bruno, Turin; Giorgio Paschetta, Sommariva del Bosco; Adler Tofanelli, Collegno, all of Italy

[73] Assignee: SIP-Societa' Italiana per l'Esercizio delle Telecomunicazioni P.A., Turin, Italy

[21] Appl. No.: 26,483

[22] Filed: Mar. 16, 1987

[30] Foreign Application Priority Data

Mar. 27, 1986 [IT]   Italy ................................ 67249 A/86

[51] Int. Cl.⁴ ............................................. H04B 3/23
[52] U.S. Cl. .................................... 370/32.1; 379/411
[58] Field of Search ................. 370/32, 32.1; 379/406, 379/410, 411; 364/724; 333/18, 28 R

[56] References Cited

U.S. PATENT DOCUMENTS 4,024,358  5/1977  Virupaksha ......................... 379/411
4,581,492  4/1986  Virdee ............................... 370/32.1

OTHER PUBLICATIONS

C. F. N. Cowan et al., "A Non-Linear Adaptive Echo Canceller for a Digital Transmission System", (1986).
N. A. M. Verhoeckx et al., "Digital Echo Cancellation for Baseband Data Transmission", (1979).

Primary Examiner—Jin F. Ng
Assistant Examiner—R. Vaas
Attorney, Agent, or Firm—Herbert Dubno

[57] ABSTRACT

The echo canceller for bidirectional digital transmission systems cancels the echo queues of a desired number N of digital symbols, transmitted on the line in the last N signalling periods. It consists of a part which effects very simply the summation of the last N transmitted symbols, so as to ease the system implementation by an integrated circuit, and of a part which computes the estimated sample of the echo-channel pulse response. The results of the two parts are multiplied by one another and the estimated echo signal is obtained.

6 Claims, 2 Drawing Sheets

ECHO CANCELLER FOR BIDIRECTIONAL DIGITAL TRANSMISSION

FIELD OF THE INVENTION

Our present invention relates to digital speech and data transmission on a subscriber line and, more particularly, to an echo canceller for a bidirectional digital transmission system of this type.

BACKGROUND OF THE INVENTION

A significant role in the development of integrated service digital network (ISDN) has been played by the 144 kbit/s transmission technique used for the access to the network by the subscriber. This technique serves to ensure a low error rate and low spectral content of the signal at high frequencies to avoid inconvenience due to crosstalk, is compatible with HiFi diffusive services and allows integration of the entire system so as to reduce cost and energy or manpower consumption and to increase reliability.

One of the main problems encountered in echo-cancellation transmission techniques is the necessity to ensure a useful-signal/residual-echo or signal-to-noise ratio (S/N) of at least 20-25 dB, so as to allow correct reception.

This S/N ratio is particularly difficult to obtain when a system is to operate also with a 40 dB line attenuation. In fact, hybrid matching to the line, seldom exceeds 10 dB; that is why an echo suppression of at least 50-55 dB is necessary to reach the desired S/N ratio value.

Echo estimation and cancellation are generally performed by a transverse-circuit or memory-type structure, which can ensure the desired accuracy to the samples on which they operate.

Memory structures can recover even nonlinear distortions present in transmission and reception circuits, while the transverse-circuit types are profitably used to cancel echo portions which do not effect these types of distortions, as they require simpler circuit designs.

However, to attain overall cancellation values of 50-55 dB, it is necessary to estimate and cancel the echo over a very high number of samples, since the queues extend over very long time intervals. The use of transverse circuit or memory cancellers for this purpose is extremely burdensome. In fact, it is necessary to operate on a very high number of samples, e.g. 25 to 35. This entails, besides increased circuit complexity, also considerably high processing speed, and prevents system implementation in CMOS technology.

The latter point is most important because CMOS technology is, nowadays, the only developed technology capable of meeting a significant number of requirements such as low-power consumption and high integration density, which can allow ISDN development.

OBJECTS OF THE INVENTION

The principal object of our present invention is to provide an improved echo cancellation circuit which obviates the above-mentioned drawbacks of earlier echo cancellation systems.

Another object of the invention is to provide an improved echo canceller for a bidirectional digital transmission system which, with circuit simplicity, low power consumption and high reliability can yield desirable levels of signal-to-residual-echo ratio while being suitable for CMOS high integration density.

It is also an object of the invention to provide an improved echo cancelling method for bidirectional digital transmission.

SUMMARY OF THE INVENTION

According to the invention, echo cancellation is effected in the last part of its pulse response so as to yield the 50-55 dB of signal-to-residual echo ratio demanded in case of a maximum-length link.

The invention, based on the behavior of echo-channel pulse-response, allows considerable simplification of electrical circuits as compared to those necessary with memory or transverse-type cancellers without increasing the internal operation speed.

Besides, the simplicity of the technique facilitates circuit implementation as an integrated circuit.

The echo canceller for bidirectional digital transmission systems according to the invention, effects a cancellation of the queues of N digital symbols transmitted on a transmission line in the last N signalling periods of a transmission.

The echo canceller comprises a shift register consisting of N cells to an input of which a signal to be transmitted is sent. This signal is linearly related to a coded signal actually transmitted on the line.

A logic circuit is provided whose inputs are connected to the input of the first cell and to the output of the last cell of the shift register, wherein are present the signal $b_k$ to be transmitted and the signal $(b_{k-N})$ transmitted N signalling periods earlier and whose outputs (10,11) present signals related to the input signals by the truth table:

| $b_k$ | $b_k$-N | 10 | 11 |
|---|---|---|---|
| 0 | 0 | 1 | — |
| 0 | 1 | 0 | 0 |
| 1 | 1 | 1 | — |
| 1 | 0 | 0 | 1 |

An Up/Down Counter (CS), which can be saturated at the maximum value N, is enabled by the signal at one of these outputs and is controlled to effect up/down counting by the signal at the other output of the logic circuit.

Furthermore, a first sign-extracting circuit has an input connected to the output of this counter to supply the sign of the counting performed, while a second sign extracting circuit has its input arranged to receive the line signal wherefrom an estimated echo signal has been subtracted.

A first multiplicity circuit multiplies the signs supplied by the first and second sign extracting circuits and an adder adds the signal at the output of the multiplying circuit to the signal resulting from the addition, delayed for a signalling period by a delay circuit. A second multiplying circuit multiplies the sum signal supplied by said adder by the signal supplied by the Up/Down counter producing the output signal which is converted into analog form and which constitutes the echo signal estimated to be subtracted from the signal received on line to yield the signal deprived of the echo queues.

The first multiplying circuit can be an exclusive-OR (EX-OR) gate.

The adder can advantageously supply a sum expressed with 6 bits.

The input externally connected to the cell corresponding to the least significant bit.

The second multiplying circuit can operate on the three most significant bits supplied by that adder.

BRIEF DESCRIPTION OF THE DRAWING

The above and other objects, features and advantages of the present invention will become more readily apparent from the following description, reference being made to the accompanying highly diagrammatic drawing, in which.

SPECIFIC DESCRIPTION

Figure 1:
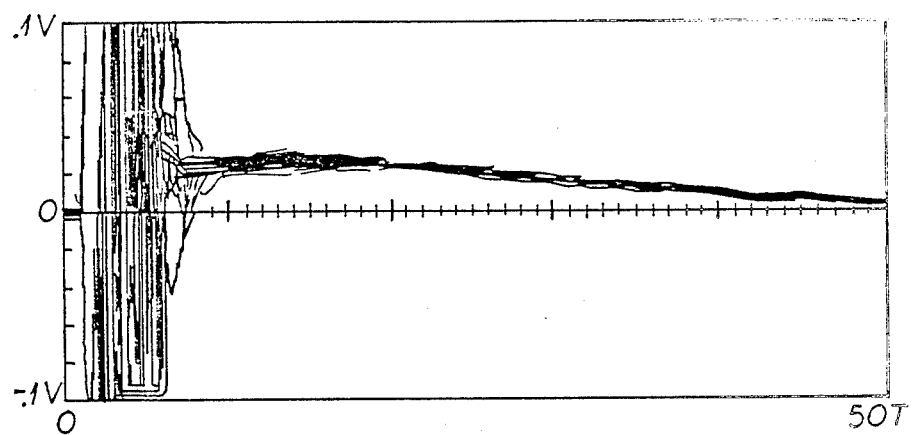
FIG. 1 is a plot of a transmission channel pulse response.

An echo-channel pulse response after a first extremely irregular and variable phase, which is a function of the hybrid imbalance, of the line type and of connection topology, has in its final part a quasi-linearly decreasing queue. FIG. 1, relating to some kinds of cables, of subscriber lines and of connection topological configurations, shows the amplitude of a pulse response as a function of time, subdivided into signalling periods.

This particular queue of pulse response does not depend on the line, in fact, FIG. 1 shows also the case of a channel consisting of a resistive termination, but solely on the characteristics of hybrid transformer.

As can be noted from this FIGURE, the amplitude of the queues remains at such a high level that cancellation is required to achieve convenient values of signal-to-residual-echo ratio, even in a case of a transmission line of maximum length.

Even though queues only depend on hybrid transformer, they are still random variables, owing to the characteristics of the hybrid itself. In fact, these characteristics can vary either as a function of tolerances in the production process or owing to the use of different materials. It is hence necessary to use an adaptive technique for their estimation and cancellation.

Figure 2:
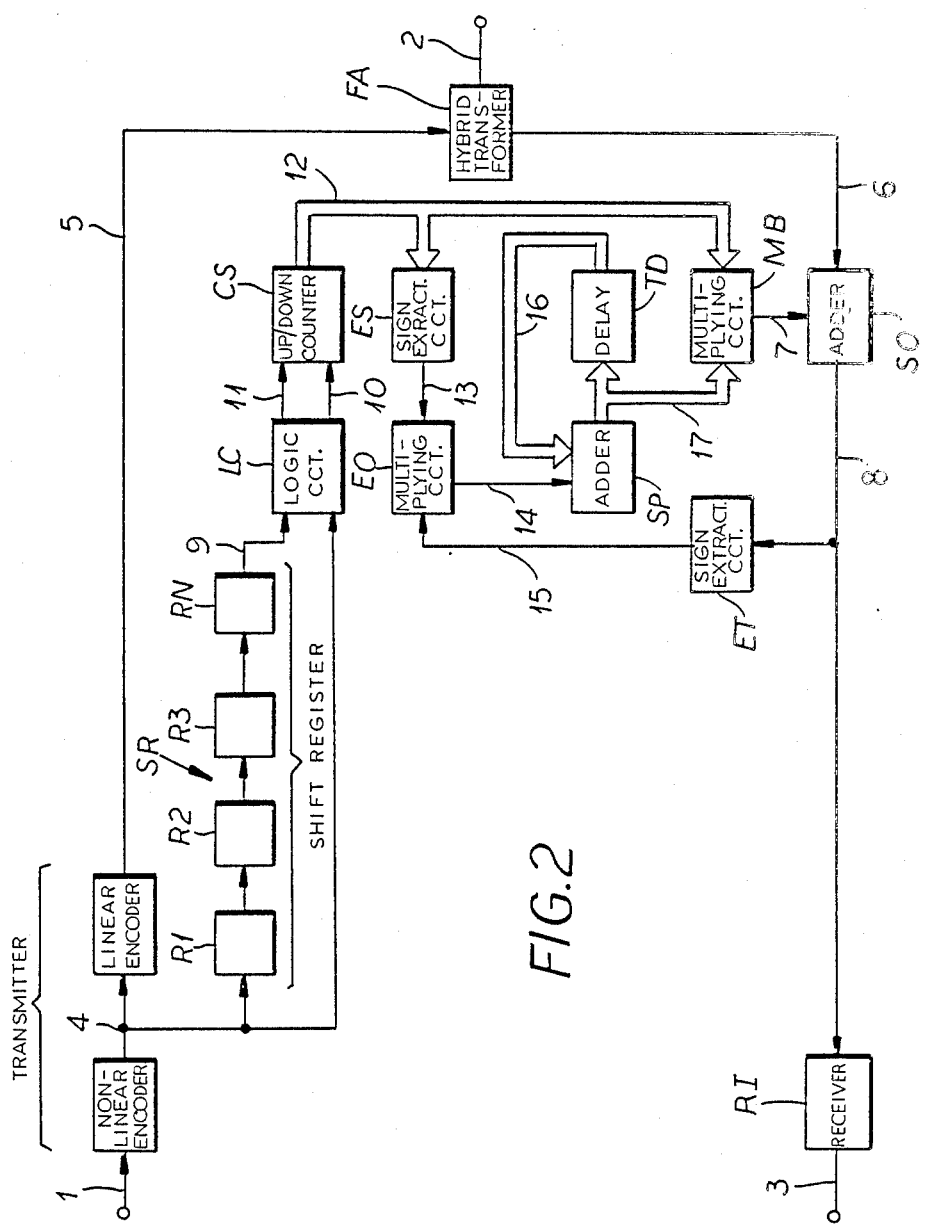
FIG. 2 is a block diagram of the circuit of the invention.

A bidirectional transmission system, comprising the improvements provided by the invention, is shown in FIG. 2.

The line 1 can be a wire on which a binary signal to be transmitted arrives, while the transmission line is represented at 2 and the wire which the received signals become available at 3.

The transmitter is represented as subdivided into two blocks NT and LT, where the linear and nonlinear parts of line encoding are effected. The encoding is generally based on a three-level code of AMI type. As is known, the nonlinear part effects a precoding whose aim is that of avoiding error propagation. In fact, since the linear encoding effected in LT is a differential encoding, an erroneous decision in the interpretation of a binary signal would the emission of subsequent erroneous signals.

On wire 4, at the NT output, a signal linearly related to the signal sent onto the line is then available and hence a signal which can be used for the estimate of the echo signal to be cancelled. The signal outgoing from LT reaches through wire 5 hybrid transformer FA and transmission line 2.

The signal coming from the remote transmitter and the echo signal of the local transmitter NT-LT pass through hybrid FA to wire 6, connected to an input of adder SO.

At the other input, connected to wire 7, the estimated echo signal is present; this is locally generated with a sign opposite to the echo signal received on wire 6. As a consequence, over wire 8 the echo-deprived useful signal is obtained as an addition effect and is sent to receiver RI to be decoded.

Let us now examine how echo signal $\hat{e}_k$ for queue cancellation is estimated at an instant k.

It is calculated as a product between the estimated sample of the pule response of the echo channel, $\hat{h}^k$, and the summation of symbols b transmitted during the N preceding signalling periods, whose echo queues are to be cancelled.

The relation is the following:

$$\hat{e}_k = \hat{h}^k \cdot \Sigma b_{k-i} \qquad (1)$$

The value of $h^k$ is to be estimated in an adaptive way so that the system might match to hybrids having different characteristics. By using the sign iterative-stochastic algorithm, we obtain:

$$\hat{h}^k = \hat{h}^{k-1} + \operatorname{sgn} N \sum_{i=0}^{b_k-1} \cdot \operatorname{sgn}(e_{k-1} - \hat{e}_{k-1}) \cdot D \qquad (2)$$

where $e_{k-1}$ is the echo signal received at instant $k-1$, D is a suitable coefficient lower than 1, which is to ensure that the estimate convergence and, of course, sign is the sign extracting function.

It can be noticed that an argument of the first function sgn in the relation (2) is equal to the second factor of the relation (1). According to the invention, this summation is not calculated by executing N additions every signalling period, but by simply incrementing or decrementing the preceding result in function of the logic level of the binary signal transmitted at the present instant, $b_k$, and of that of the binary signal transmitted N signalling periods before, $b_{k-N}$.

To obtain that, precoded signal $b_k$, present on wire 4, is sent both to a shift register SR consisting of N cells R1, R2, R3 ... RN, where N is the duration, expressed in signalling periods, of the pulse response of the echo to be cancelled, and to a logic circuit LC. At the other input of LC, connected to wire 9, signal $b_{1-N}$ is present, extracted from the last cell RN of the shift register. The signals at the outputs connected to wires 10 and 11 depend on those at the input according to the following relation:

| $b_k$ | $b_k$-N | 10 | 11 |
| --- | --- | --- | --- |
| 0 | 0 | 1 | — |
| 0 | 1 | 0 | 0 |
| 1 | 1 | 1 | — |
| 1 | 0 | 0 | 1 |

They are used to control an up/down counter CS, which can be saturated to a maximum counting value N.

More particularly, the signal on wire 10 enables the counter CS when at a low logic level and the signal on wire 11 controls up/down counting, according to high or low logic level.

Since CS is a saturable counter, by exploiting the characteristics of line signals with long sequences of binary 1s, corresponding to the absence of a signal during the initial activation phase or in the transmission frame, both counter CS and shift register R1, . . . RN need not be initialized, but they have self-positioning characteristics.

At the output of counter CS on connection 12, the summation of the signals transmitted in the last N signalling periods is then available, its sign is detected by a sign extracting circuit ES and is sent via wire 13 to a multiplying circuit EO, advantageously implemented with a logic EX-OR circuit.

This multiplying circuit receives also the sign of the difference between the estimated echo signal and the actual echo signal, supplied by the sign extracting circuit ET on wire 15.

The result of the multiplication, present on wire 14, is sent to a 6-bit adder SP. According to which adder cell the multiplication result is sent to, different values of coefficient D, of relation (2) are obtained.

The multiplication result is sent to the cell corresponding to the least significant bit.

At the other input of adder SP, connected to connection 16, the result of the preceding sum $\hat{h}^{k-1}$ arrives delayed by a signalling period by delay circuit TD. At the output of SP, on connection 17, the estimated sample of the pulse response of the echo channel, $\hat{h}^k$ by the relation (2), is obtained.

To estimate the echo signal e, it is now necessary to implement relation (1). Since the queue slope of the echo-pulse response is very low, the three most significant bits are used to represent the amplitude, since it tends to 0, always starting from a positive value.

The value of $\hat{h}$, present on connection 17, multiplied in a multiplying circuit MB by the summation of the transmitted binary signals, present on connection 12, and the result converted into analog form, is sent via wire 7 to adder SO for the cancellation.

The method has been simulated by taking into account the echo-pulse responses measured with N =30. For comparison purposes, the suppression value of an echo canceller with 14 taps, i.e. 7 memory taps and 7 transversal ones, is reported deprived of the invention circuit.

Figure 3:
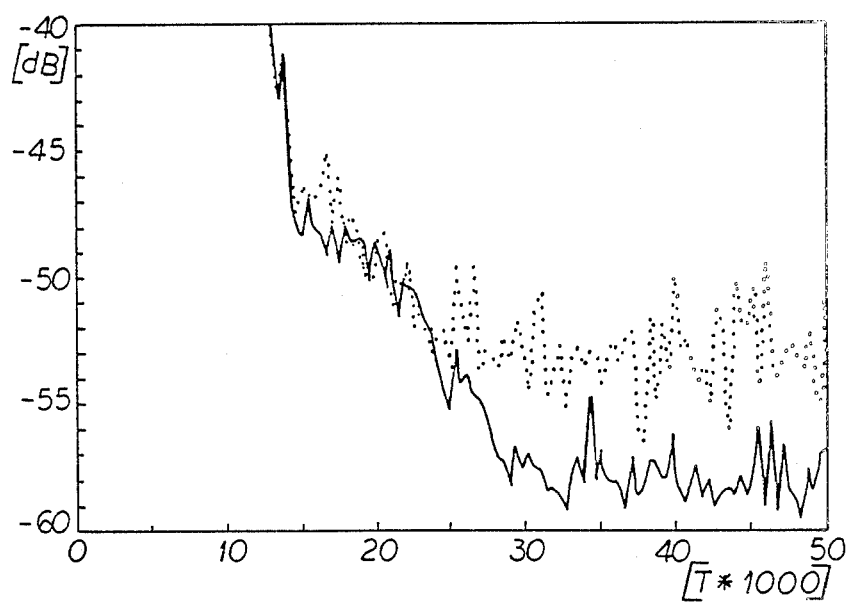
FIG. 3 is a graph showing the pulse response of a transmission channel with and without the circuit provided by the invention.

The two results are compared in FIG. 3, which also represents the adaptive correction step to render the convergence of the memory part of the canceller faster. The dashed curve relates to the comparison canceller alone, while the solid one comprises also the queue-cancelling circuit of the invention. In this FIGURE the effect of 12-bit D/A converter used in the cancellation is also considered.

It is worth noticing that the gain is of about 6 dB, and 55-dB cancellation values can be attained which are indispensable to ensure a correct operation of the system with lines having an attenuation of 40 dB at 100 kHz.

We claim:

1. An echo canceller for a bidirectional transmission system capable of effecting a cancellation of echoes of N digital symbols transmitted on a transmission line in the last N signalling periods of a transmission, said echo canceller comprising:
 a shift register consisting of N cells having an input to a first cell thereof receiving a signal to be transmitted and linearly related to a coded signal transmitted on said line;
 a logic circuit having a first input connected to said input to said first cell and a second input connected to an output from a last cell of said shift register and having first and second outputs related to said first and second inputs by the following truth table:

| First Input | Second Input | First Output | Second Output |
|---|---|---|---|
| 0 | 0 | 1 | — |
| 0 | 1 | 0 | 0 |
| 1 | 1 | 1 | — |
| 1 | 0 | 0 | 1 | an up/down counter connected to said first and second outputs and saturable at a maximum count value of N, said counter being enabled by a signal on said first output and being controlled for up/down counting by a signal on said second output;
 a first sign extracting circuit connected to an output of said counter for outputting the sign of a counting performed by said counter;
 a second sign extracting circuit receiving a line signal from which an estimated echo signal has been subtracted;
 a first multiplying circuit for multiplying signs supplied at outputs of said sign extracting circuits;
 an adder having one input connected to said first multiplying circuit, an other input, and an output;
 a delay circuit connected to said output of said adder and applying to said other input of said adder the output signal thereof delayed by a signalling period, said adder adding the signals received at its inputs;
 a second multiplying circuit connected to said output of said adder and to said counter for multiplying an added signal supplied by said adder with an output signal from said counter to produce an output representing an echo signal to be subtracted from a signal to be received on said transmission line; and
 a further adder connected to said second multiplying circuit for subtracting said output representing an echo signal from said signal to be received on said transmission line.

2. The echo canceller defined in claim 1 wherein said first multiplying circuit is an exclusive-OR gate.

3. The echo canceller defined in claim 1 wherein the first-mentioned adder outputs a sum expressed with six bits.

4. The echo canceller defined in claim 1 wherein an input externally connected to said first multiplying circuit is internally connected to a cell corresponding to the least significant bit.

5. The echo canceller defined in claim 1 wherein said second multiplying circuit operates on the three most significant bits supplied by the first mentioned adder.

6. An echo cancelling method for a bidirectional transmission system capable of effecting a cancellation of echoes of N digital symbols transmitted on a transmission line in the last N signalling periods of a transmission, said echo canceller, comprising the steps of:
 supplying to a shift register, consisting of N cells, at an input to a first cell thereof, a signal to be transmitted and linearly related to a coded signal transmitted on said line;
 operating a logic circuit having a first input connected to said input to said first cell and a second input connected to an output from a last cell of said shift register so as to produce first and second outputs related to said first and second inputs by the following truth table:

| First Input | Second Input | First Output | Second Output |
| --- | --- | --- | --- |
| 0 | 0 | 1 | — |
| 0 | 1 | 0 | 0 |
| 1 | 1 | 1 | — |
| 1 | 0 | 0 | 1 | controlling an up/down counter connected to said first and second outputs and saturable at a maximum count value of N, said counter being enabled by a signal on said first output and being controlled for up/down counting by a signal on said second output;

in a first sign extracting circuit, connected to an output of said counter, outputting the sign of a counting performed by said counter;

in a second sign extracting circuit, receiving a line signal from which an estimated echo signal has been subtracted, outputting the sign of said line signal from which said estimated echo signal has been subtracted;

in a first multiplying circuit multiplying signs supplied at outputs of said sign extracting circuits;

adding in an adder the output of said first multiplying circuit and an added signal of the adder delayed by a signalling period; and in a second multiplying circuit, connected to an output of said adder and to said counter, multiplying an added signal supplied by said adder with an output signal from said counter to produce an output representing an echo signal to be subtracted from a signal to be received on said transmission line.

* * * * *